United States Patent
Abraham et al.

(10) Patent No.: US 8,826,389 B2
(45) Date of Patent: Sep. 2, 2014

(54) MULTI-MEDIA IDENTITY MANAGEMENT SYSTEM

(75) Inventors: Subil M. Abraham, Plano, TX (US); Rajaraman Hariharan, Bangalore (IN); Ramakrishnan Kannan, Bangalore (IN); Mathews Thomas, Flower Mound, TX (US); Julio Wong, Pembroke Pines, FL (US)

(73) Assignee: International Business Machines Corporation, Armonk, NY (US)

(*) Notice: Subject to any disclaimer, the term of this patent is extended or adjusted under 35 U.S.C. 154(b) by 164 days.

(21) Appl. No.: 13/467,134

(22) Filed: May 9, 2012

(65) Prior Publication Data

US 2013/0305315 A1 Nov. 14, 2013

(51) Int. Cl.
*H04L 9/32* (2006.01)
*G06F 7/04* (2006.01)
*G06F 21/20* (2006.01)

(52) U.S. Cl.
USPC .................................. 726/4; 726/3

(58) Field of Classification Search
CPC .............. H04L 9/32; G06F 7/04; G06F 21/20
USPC ........................................................ 726/4, 3
See application file for complete search history.

(56) References Cited

U.S. PATENT DOCUMENTS

| 7,016,516 B2 | 3/2006 | Rhoads |
| 7,113,596 B2 | 9/2006 | Rhoads |
| 7,804,982 B2 | 9/2010 | Howard et al. |
| 2007/0106405 A1* | 5/2007 | Cook et al. ...................... 700/94 |
| 2009/0266882 A1 | 10/2009 | Sajkowsky |
| 2009/0288159 A1* | 11/2009 | Husemann et al. ............. 726/16 |
| 2010/0094897 A1 | 4/2010 | Sumrall et al. |
| 2010/0188191 A1 | 7/2010 | Martinez De Velasco Cortina et al. |
| 2010/0226526 A1 | 9/2010 | Modro et al. |
| 2010/0290666 A1 | 11/2010 | Rhoads |
| 2010/0303338 A1 | 12/2010 | Stojancic et al. |

OTHER PUBLICATIONS

Undisclosed Authors; Title: Process for visual authentication using an authorized mobile device; Jan. 13, 2011; Dababase: IP COM; IP COM No. IPCOM000202989D.

* cited by examiner

*Primary Examiner* — Brandon Hoffman
*Assistant Examiner* — Samuel Ambaye
(74) *Attorney, Agent, or Firm* — Patents on Demand P.A.; Brian K. Buchheit; Scott M. Garrett (57) ABSTRACT

A method for utilizing multi-media identities for access control to a secure area or item can begin with a multi-media identity management system providing a multi-media identity to an entity for use with an access control system. The multi-media identity can be a digital identifier defining multi-media authentication data and security privileges for the entity. The provided multi-media identity and multi-media authentication data can be received in an access request for a secure area or item. The multi-media authentication data can be verified against the multi-media data elements of the multi-media identity. The security privileges of the multi-media identity can be validated for the secure area or item. When the multi-media authentication data, multi-media identity, and security privileges are valid, the entity can be granted access and denied access when at least one item is invalid.

20 Claims, 6 Drawing Sheets

MULTI-MEDIA IDENTITY MANAGEMENT SYSTEM

BACKGROUND

The present invention relates to the field of identity management and, more particularly, to a multi-media identity management system.

Access control systems have become a commonplace feature of most people's daily lives—from usernames and passwords to access computers and/or online data to automated teller machine (ATM) cards and identification numbers (e.g. PINs) to withdraw cash. Many organizations incorporate additional levels of security, both physical and digital, into their access control systems, especially those that protect sensitive physical areas, items, and/or data. Thus, it has become common for people, particularly those who work in organizations that utilize multiple and/or varying levels of access control protocols, to encounter issues managing their access data and/or physical artifacts.

For example, a person may have to juggle a username and password to log onto the company's network, an access card and PIN number to enter a first lab, a different access card and security code to enter a second lab, a security code for a cabinet to access chemicals in the lab, and another username and password set to view lab data. In addition to remembering these important pieces of information, the person must also keep track of another set of access information (e.g., online account usernames and passwords, PIN numbers, etc.).

A variety of approaches have been developed to help mitigate these types of issues like single sign-on network authentication and "electronic wallets". While these approaches are useful in some situations, they do not address situations where the user must provide different types of physical artifacts or where the different systems that capture the authentication input are unable to communicate. Further, these conventional approaches do not verify that the user accesses only a specific area or is in the presence of a specified individual when the area is accessed.

BRIEF SUMMARY

One aspect of the present invention can include a method for utilizing multi-media identities for access control to a secure area or item. Such a method can begin with a multi-media identity management system providing a multi-media identity to an entity for use with an access control system. The multi-media identity can be a digital identifier whose multi-media data elements define multi-media authentication data expected to be used by the entity and security privileges of the access control system assigned to the entity. The multi-media identity can be stored upon a portable identification device. The provided multi-media identity and multi-media authentication data can be received in an access request for a secure area or item. The multi-media authentication data can include at least a digital image of the entity and can be captured by multi-media capture devices in real-time or near real-time. The multi-media authentication data can be verified against the multi-media data elements of the multi-media identity. Each multi-media authentication data item can be compared to a multi-media data element of the multi-media identity of a corresponding multi-media type. The security privileges of the multi-media identity can then be validated for the secure area or item. When the multi-media authentication data, multi-media identity, and security privileges are valid, the entity can be granted access to the secure area or item. When at least one of the multi-media authentication data, multi-media identity, and security privileges is invalid, the entity can be denied access to the secure area or item.

Another aspect of the present invention can include a system for utilizing multi-media identities for access control to a secure area or item. Such a system can include a multi-media identity, multi-media authentication data, and a multi-media identity management system. The multi-media identity can be a digital data container associated with an entity and can have multi-media data elements that define multi-media aspects of the entity. The multi-media identity can include metadata for representing textual multi-media data elements as field-value pairs and at least one multi-media fingerprint that can represent non-textual multi-media data elements in a distilled format. A multi-media fingerprint can be a baseline representation of a multi-media aspect of the entity. The multi-media authentication data can be identification for the entity. The quantity of multi-media authentication data items submitted can match the quantity and multi-media types of the multi-media data elements contained in the entity's multi-media identity. The multi-media identity management system can be configured to manage multi-media identities and validate the multi-media identity based upon a comparison with the multi-media authentication data.

Yet another aspect of the present invention can include a computer program product that includes a computer readable storage medium having embedded computer usable program code. The computer usable program code can be configured to provide a multi-media identity to an entity for use with an access control system. The multi-media identity can be a digital identifier whose multi-media data elements define multi-media authentication data expected to be used by the entity and security parameters of the access control system assigned to the entity. The multi-media identity can be stored upon a portable identification device. The computer usable program code can be configured to receive the provided multi-media identity and multi-media authentication data in an access request for a secure area or item. The multi-media authentication data can include at least a digital image of the entity and can be captured by multi-media capture devices in real-time or near real-time. The computer usable program code can be configured to verify the multi-media authentication data against the multi-media data elements of the multi-media identity. Each multi-media authentication data item can be compared to a multi-media data element of the multi-media identity of a corresponding multi-media type. The computer usable program code can be configured to, when the multi-media authentication data, multi-media identity, and security privileges are determined valid for the secure area or item, notify the access control system that the entity is allowed access. The access control system can perform additional validation actions, when necessary. The computer usable program code can then be configured to, when the multi-media authentication data and/or multi-media identity is invalid, notify the access control system that the entity is denied access.

In embodiments of the disclosure, multi-media refers to media and content that uses a combination of different forms. Multi-media includes text, audio, still images, animated images, video, interactive user interfaces, and combinations thereof. In embodiments of the disclosure, video, associated audio, etc. can be used to create the multi-media identity.

DETAILED DESCRIPTION

The present invention discloses a solution that utilizes multi-media identities for access control to a secure area or item. A multi-media identity management system can perform functions related to the creation, management, and verification of multi-media identities. A multi-media identity can be a digital identifier defining multi-media authentication data and security privileges for an entity. At a later point, the entity can provide the multi-media identity management system with their multi-media identity and multi-media authentication data for verification. If determined as valid, the entity's security privileges can be assessed by the multi-media identity management system or an access control system. Access to the secure area or item can then be granted or denied.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
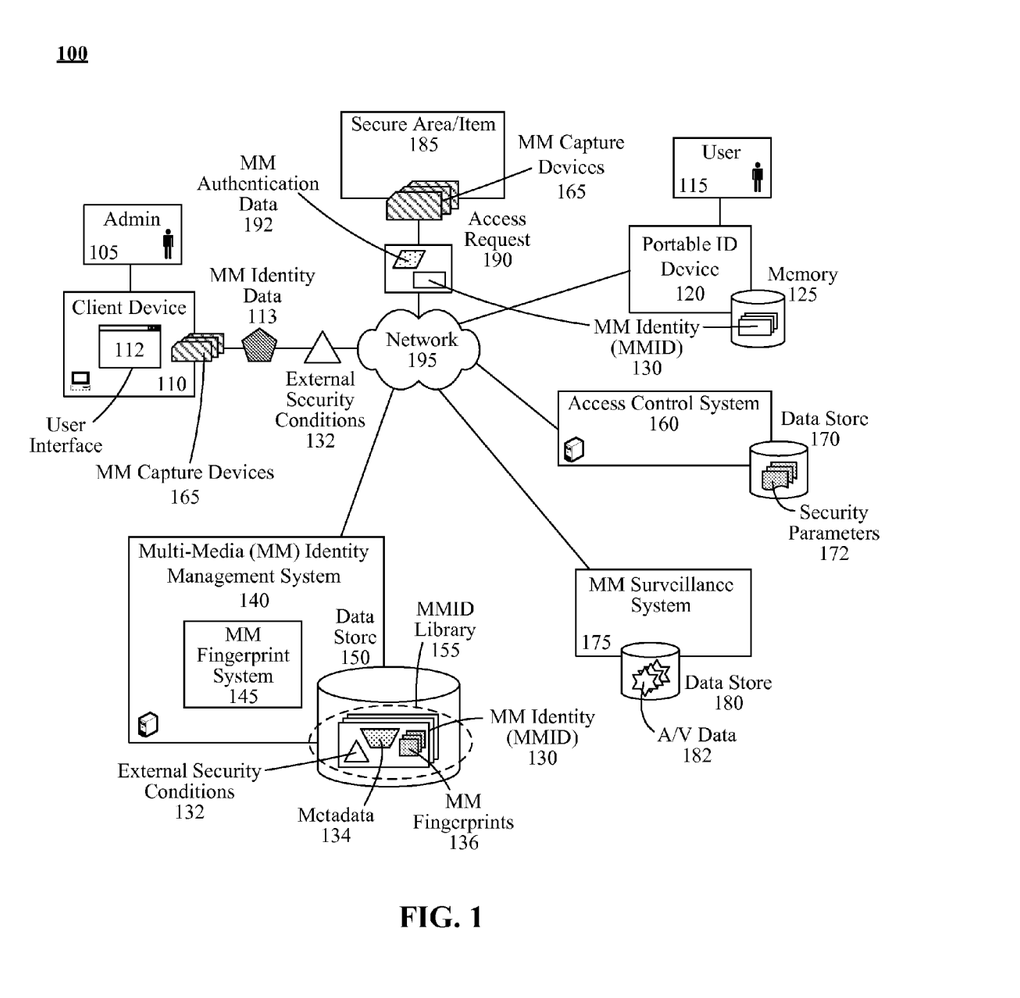
FIG. 1 is a schematic diagram illustrating a system that utilizes a multi-media (MM) identity management system to provide a user with a MM identity (MMID) for accessing a secure area/item in accordance with embodiments of the inventive arrangements disclosed herein.

FIG. 1 is a schematic diagram illustrating a system 100 that utilizes a multi-media (MM) identity management system 140 to provide a user 115 with a MM identity (MMID) 130 for accessing a secure area/item 185 in accordance with embodiments of the inventive arrangements disclosed herein. In system 100, the user 115 can provide a MMID 130 from the memory 125 of a portable identification device 120 and MM authentication data 192 obtained by multi-media capture devices 165 to the multi-media identity management system 140, access control system 160, and/or a multi-media surveillance system 175 in order to access the secure area/item 185.

The secure area/item 185 can represent a variety of physical and/or virtual locations as well as objects to which one or more multi-media capture devices 165 can be attached or integrated. A multi-media capture device 165 can represent an electronic device capable of receiving MM authentication data 192 of a specific multi-media type from the user 115. Examples of multi-media capture devices 165 can include, but are not limited to, digital cameras, digital video cameras, a number pad, a keyboard, a keypad, a biometric input device (e.g., fingerprint scanner, retinal scanner, etc.), a microphone, and the like.

For example, the secure area/item 185 can be a desktop computer connected to an enterprise network 195 that requires entry of a username and password to use. The multi-media capture devices 165 of the desktop computer could then include a keyboard and mouse.

As another example, the secure area/item 185 can be a server room that requires the user 115 to swipe an ID badge and enter a security code into the door's lock. In this example, the multi-media capture devices 165 can be represented by the magnetic or radio-frequency identification (RFID) reader for the ID badge and the input mechanism of the lock.

The multi-media capture devices 165 used with the secure area/item 185 can be components of a larger access control system 160 and/or a multi-media surveillance system 175 utilized within a physical structure and/or by the owning organization. Since the operation and technology associated with access control systems 160 and multi-media surveillance systems 175 are well-known to those skilled in the art, only those aspects pertaining to the present disclosure shall be discussed herein.

The access control system 160 can represent the hardware and/or software components required to enforce security parameters 172 that physically and/or virtually restrict access to the secure area/item 185. One or more multi-media capture devices 165, such as those associated with the secure area/item 185, can accept MM authentication data 192 and the MMID 130 from the user 115.

The security parameters 172 can define the conditions and/or values (e.g., password, organizational role or position, etc.) that allow users 115 access to various secure areas/items 185. The security parameters 172 defined for the access control system 160 can be stored in a data store 170.

The multi-media surveillance system 175 can represent the hardware and/or software components, including a variety of multi-media capture devices 165, required to provide audio and/or visual (A/V) data 182. The A/V data 182 obtained by the multi-media capture devices 165 can be stored in a data store 180. The A/V data 182 can include still pictures as well as continuous video.

In another contemplated embodiment, the multi-media surveillance system 175 can be integrated as a component of the access control system 160. In such an embodiment, a single data store 170 can be used to store both the security parameters 172 and A/V data 182.

The multi-media capture devices 165 used to safeguard the secure area/item 185 can be capable of accepting the user 115's MMID 130 and MM authentication data 192 electronically and/or physically. Submission of the user 115's MMID 130 via the multi-media capture devices 165 can be performed by means that are commensurate with the capabilities of both the multi-media capture devices 165 and the portable identification device 120.

For example, if the portable identification device 120 is a smart card that stores the MMID 130 in a RFID tag, then the multi-media capture devices 165 can include a RFID reader to obtain the MMID 130 from the memory 125 of the RFID tag. As an alternate example, if the portable identification device 120 is an electronic device configured to send the MMID 130 over an area network (e.g. PAN) 195, the multi-media capture devices 165 can include at least one device configured to communicate with the portable identification device 120 over the PAN using the correct protocols.

It should be noted that in those situations where the MMID 130 is wirelessly conveyed to a multi-media capture device 165 over a network 195, additional components can be implemented within this embodiment of the present disclosure to account for transmission security (e.g., encryption/decryption, transfer protocols, etc.) without departing from the spirit of the present disclosure.

The MMID 130 can represent an electronic identity for the user 115 that can be used to determine if the user 115 is authorized to access the secure area/item 185. Creation, management, and verification of the MMID 130 can be supported by the multi-media identity management system 140.

Creation of a MMID 130 can be performed by an admin 105 of the system 140 using a user interface 112 for the multi-media identity management system 140 running on a client device 110 and one or more multi-media capture devices 165. The user interface 112 can be a graphical means for the admin 105 to collect multi-media identity data 113 for the user 115 using the multi-media capture devices 165 and define any additional external security conditions 132. The client device 110 can represent a variety of computing devices capable of supporting operation of the user interface 112 and communicating with the multi-media identity management system 140 and/or the user 115's portable identification device 120 over the network 195.

For example, when issuing a security identification badge in a secure facility, an authorized person, the admin 105, can ask the user 115 for various multi-media identity data 113 like information (e.g., name, organization, social security number, etc.) and/or define security information (e.g., PIN number, security code, etc.).

Depending upon the type and/or level of security implemented by the access control system 160, different pieces of the multi-media identity data 113 can be of different media types. For example, the multi-media identity data 113 can include a photo or video segment of the user 115, a textual password defined by the user 115, an audio segment of the user 115 speaking their name, and a digital image of the fingerprint for their right-hand index finger. In this example, the client device 110 would need to have a digital camera (still or video), microphone, fingerprint scanner, and keyboard as multi-media capture devices 165.

Additionally, the admin 105 can specify external security conditions 132 that are to be associated with the user 115's MMID 130. An external security condition 132 can represent a parameter that is not supported by a conventional access control system 160 or identity management system, but must be satisfied to validate the MMID 130. The multi-media identity management system 140 can enforce the external security conditions 132 in addition to performing user 115 authentication.

For example, an external security condition 132 can specify that User H 115 must accompany User K 115 into the lab 185. Another example of an external security condition 132 can be to indicate that, although the user 115 is being assigned security parameters 172 for general lab access, the user 115 is only to access Lab J 185.

In essence, the external security conditions 132 can be used to add levels of granularity to broad privileges defined by security parameters 172 as well as enable verification of parameters that the access control system 160 may not utilize or may be too cumbersome to implement in its security parameters 172.

Once the multi-media identity data 113 is submitted, the multi-media identity management system 140 can generate the MMID 130 for the user 115. The multi-media identity management system 140 can represent the hardware and/or software components necessary to handle the usage of MMIDs 130 in system 100. The multi-media identity management system 140 can be configured to exchange data with the access control system 160 and/or multi-media surveillance system 175 over a network 195.

In another embodiment, the multi-media identity management system 140, access control system 160, and/or multi-media surveillance system 175 can be integrated into a singular, comprehensive MMID-based security system.

The MMID 130 generated by the multi-media identity management system 140 can have a data structure that contains the external security conditions 132, metadata 134, and one or more multi-media fingerprints 136. Both the metadata 134 and multi-media fingerprints 136 can be generated from the submitted multi-media identity data 113.

The metadata 134 can represent various field-value pairs that can define properties and/or the behavior of the MMID 130 as well as reference the security parameters 172 granted to the user 115. Values for the metadata 134 can be extracted from textual multi-media identity data 113 and/or provided by other data systems like the access control system 160 or a human resources system.

The multi-media fingerprints 136 can be generated from the multi-media identity data 113 by the multi-media fingerprint system 145 of the multi-media identity management system 140. The multi-media fingerprint system 145 can be the hardware and/or software required to create a multi-media fingerprint 136 of a specific type (e.g., audio, image, biometric, etc.).

A multi-media fingerprint 136 can be a static control file of a multi-media type that will later serve as a baseline to verify the user 115 when they submit a corresponding item of MM authentication data 192.

For example, facial recognition techniques can be used on the digital photo 113 submitted for the user 115. In such a technique, facial features that are relatively static, such as eye size, eye shape, and the distance between the eyes, can be extracted to identify the basic elements that comprise the user 115's face; more dynamic elements like hair style or jewelry can be ignored.

Once the MMID 130 is created, the multi-media identity management system 140 can save the MMID 130 to the MMID library 155 contained in a data store 150. The MMID library 155 can be the collection of MMIDs 130 that are currently in use by the multi-media identity management system 140. A copy of the MMID 130 can be saved to the memory 125 of the user 115's portable identification device 120.

The portable identification device 120 can be a physical device capable of receiving the copy of the MMID 130 over the network 195 (i.e., wirelessly or via a data cable). The specific type of portable identification device 120 used can vary based upon the design and capabilities of the multi-media identity management system 140 and/or access control system 160 and/or multi-media surveillance system 175.

In a preferred embodiment of the present disclosure, the portable identification device 120 can be a computing device like a smart phone with built-in memory 125 storage, a digital camera, a microphone and a network transceiver. In this embodiment, the computing device can include a user interface to allow the user 115 to perform basic management functions on their MMIDs 130, ensuring that the contents of the MMID library 155 adequately reflects the physical changes of the user that could affect verification.

For example, the user 115 may experience a health issue that affects the pitch of their voice, which causes the user 115's MMID 130 to be determined invalid. Using the user interface and microphone of the smart phone, the user 115 would be able to provide the multi-media identity management system 140 with new audio multi-media identity data 113. A new multi-media fingerprint 136 can be created and the applicable MMIDs 130 for the user 115 can be updated in the MMID library 155 and the portable identification device 120.

In another embodiment, the portable identification device 120 can be a plastic card or badge that utilizes a RFID tag or magnetic strip for memory 125.

Once the MMID 130 is loaded into the portable identification device 120, the user 115 can proceed to the secure area/item 180. The user 115 can then submit their MMID 130 and MM authentication data 187 via the multi-media capture devices 165, generating an access request 190 to be authenticated by the multi-media identity management system 140 and access control system 160.

It is important to note that submission of the MMID 130 when accessing the secure area/item 180 can provide additional levels of security to the overall system 100 that are superior to conventional systems. For example, digital fingerprinting can be used to ensure that the audio and/or visual multi-media fingerprints 136 of the submitted MMID 130 match those contained in the MMID library 155; reducing the probability that the MMID 130 can be forged or altered.

In one embodiment, the multi-media capture devices 165 at the secure area/item 185 can include a digital camera to take a real-time image of the user 115 that can be processed for comparison to the MMID 130. This configuration can eliminate the ability for an authorized user 115 to gain access to the secure area/item 185 simply because they have a password or security code and an authorized user 115's portable identification device 120.

An additional benefit of the multi-media identity management system 140 can be the flexibility for defining MMIDs 130. Most conventional access control systems 160 or identity management/verification systems can only support a one-to-one relationship between users 115 and a digital/physical ID and/or set of security parameters 172. This situation can result in a user 115 having to manage multiple IDs, which can get confusing.

The multi-media identity management system 140 can be configured to support a many-to-one relationship as well as a one-to many relationship between users 115 and MMIDs 130. The many-to-one relationship can represent various access scenarios of multiple users 115 having an identical set of external security conditions 132 and/or security parameters 172.

For example, the MMID 130 for a group of four visitors 115 can be defined to require that all four visitors 115 be present for access to the secure area/item 185 to be granted. When this MMID 130 is created, the image for the multi-media identity data 113 can include all four visitors 115. Thus, the image captured by the multi-media capture devices 165 at the secure area/item 185 can be processed to determine if all four visitors 115 are present.

Network 195 can include any hardware/software/and firmware necessary to convey data encoded within carrier waves. Data can be contained within analog or digital signals and conveyed though data or voice channels. Network 195 can include local components and data pathways necessary for communications to be exchanged among computing device components and between integrated device components and peripheral devices. Network 195 can also include network equipment, such as routers, data lines, hubs, and intermediary servers which together form a data network, such as the Internet. Network 195 can also include circuit-based communication components and mobile communication components, such as telephony switches, modems, cellular communication towers, and the like. Network 195 can include line based and/or wireless communication pathways.

As used herein, presented memory 125 and data stores 150, 170, and 180 can be a physical or virtual storage space configured to store digital information. Memory 125 and data stores 150, 170, and 180 can be physically implemented within any type of hardware including, but not limited to, a magnetic disk, an optical disk, a semiconductor memory, a digitally encoded plastic memory, a holographic memory, or any other recording medium. Memory 125 and data stores 150, 170, and 180 can be a stand-alone storage unit as well as a storage unit formed from a plurality of physical devices. Additionally, information can be stored within memory 125 and data stores 150, 170, and 180 in a variety of manners. For example, information can be stored within a database structure or can be stored within one or more files of a file storage system, where each file may or may not be indexed for information searching purposes. Further, memory 125 and/or data stores 150, 170, and 180 can utilize one or more encryption mechanisms to protect stored information from unauthorized access.

Figure 2:
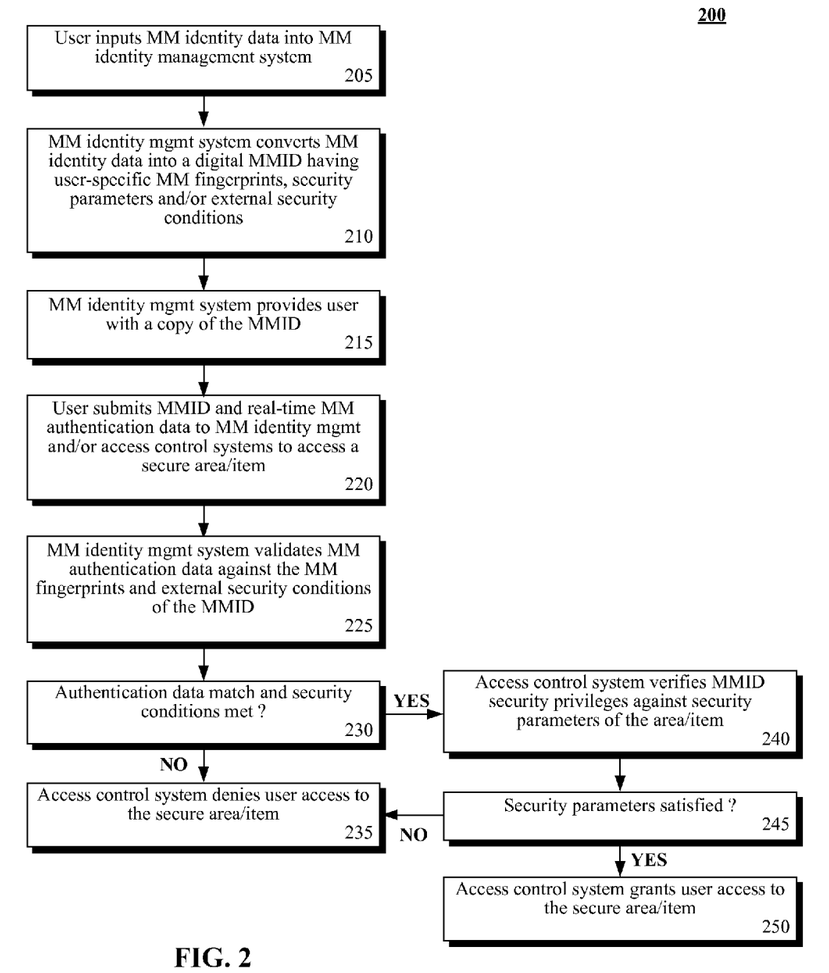
FIG. 2 is a flowchart of a method describing, at a high-level, the use of the multi-media identity management system in accordance with an embodiment of the inventive arrangements disclosed herein.

FIG. 2 is a flowchart of a method 200 describing, at a high-level, the use of the multi-media identity management system in accordance with embodiments of the inventive arrangements disclosed herein. Method 200 can be performed within the context of system 100.

Method 200 can begin in step 205 where the user can input multi-media identity data into the multi-media identity management system. Input of the data, as shown in system 100, can require the use of multi-media capture devices and the supervision of an authorized agent (e.g., administrator, security specialist, etc.) who has the appropriate privileges to perform MMID creation functions. The authorized agent can also input additional external security conditions, if implemented, during step 205.

The multi-media identity management system can convert the multi-media identity data into a corresponding digital MMID that has user-specific multi-media fingerprints, security parameters, and/or external security conditions in step 210. In step 215, the multi-media identity management system can provide the user with a copy of the MMID.

After the creation process, the user can submit the MMID and real-time multi-media authentication data to the multi-media identity management system and/or access control system to access a secure area/item, in step 220.

In contemplated embodiments, different configurations can perform authorization and authentication actions in different orders. Thus, in one embodiment, authentication can occur first and authorization can occur second, where authorization is dependent on the initial authentication. In another embodiment, parallel processing can occur, where authorization and authentication can occur independently of each other or at substantially the same time. The scope of the disclosure is not to be construed as limited in this regard. In other words, the data flow regarding whether the multi-media identity management system or the access control system receives the multi-media authentication data first or not can be dependent upon the specific implementation of the multi-media identity management system as well as the configuration of the overall security system.

In step 225, the multi-media identity management system can validate the received multi-media authentication data against the multi-media fingerprints and external security conditions of the MMID. It can be determined in step 230 if the multi-media authentication data matches the multi-media fingerprints and the external security conditions are met.

It should be noted that running steps beyond step 230 can require the multi-media identity management system to communicate its determination to the access control system.

When there is a discrepancy in the validation of the multi-media authentication data and/or external security conditions, step 235 can be performed where the access control system denies the user access to the secure area/item. When the multi-media authentication data is a match and the external security conditions are satisfied, the access control system can verify the security privileges referenced in the metadata of the MMID against the security parameters defined for the secure area/item in step 240.

In step 245, the access control system can determine if the MMID meets the security parameters of the secure area/item. When the security parameters are not satisfied, flow of method 200 can proceed to step 235 where the access control system denies the user access to the secure area/item. When the security parameters are satisfied, the access control system can grant the user access to the secure area/item in step 250.

It is important to emphasize that, while the steps of method 200 are arranged linearly, the operations represented by steps 225 and 240 can be performed in parallel. That is, the access control system can verify the security parameters while the multi-media identity management system is validating the multi-media authentication data and external security conditions. Method 200 can then be adjusted to perform step 250 if both systems determine the MMID to be valid for the secure area/item and perform step 235 in all other cases.

Figure 3:
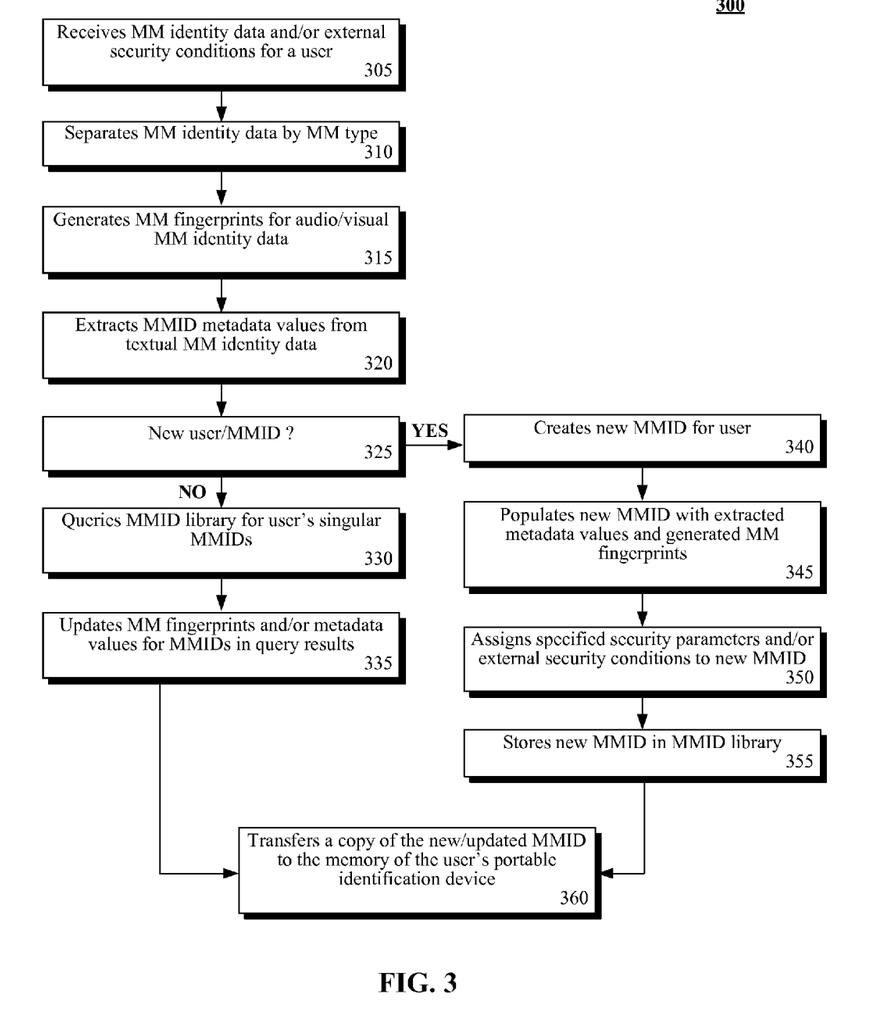
FIG. 3 is a flowchart of a method detailing the MMID creation/management functionality of the multi-media identity management system in accordance with an embodiment of the inventive arrangements disclosed herein.

FIG. 3 is a flowchart of a method 300 detailing the MMID creation/management functionality of the multi-media identity management system in accordance with embodiments of the inventive arrangements disclosed herein. Method 300 can be performed within the context of system 100 and/or in conjunction with method 200.

Method 300 can begin in step 305 where the multi-media identity management system can receive the multi-media identity data and/or external security conditions. Step 305 can be performed by an authorized agent (e.g., admin) of the system entrusted with creating MMIDs or by a user, in a lesser capacity, to update data elements of their MMID.

The received multi-media identity data can be separated by multi-media type in step 310. In step 315, multi-media fingerprints can be generated for multi-media identity data categorized as audio and/or visual multi-media types. The multi-media fingerprint system of the multi-media identity management system can be used to perform step 315.

In step 320, metadata values for the MMID can be extracted from the textual multi-media identity data. The multi-media identity management system can determine if the received multi-media identity data is for a new user or new MMID, as opposed to an existing MMID, in step 325.

When the multi-media identity data is for an existing MMID, step 330 can be performed where the multi-media identity management system can query the MMID library for the user's singular MMIDs and not any group or multi-user MMIDs that the user may belong. That is, if the MMID pertains to three users, all three users would need to be present in order for the multi-media identity management system to accept modifications; a single member cannot change the multi-media identity data for the entire group.

The multi-media fingerprints and/or metadata values for the MMIDs in the query results can be updated in step 335. Upon completion of step 335, step 360 can be performed where a copy of the updated MMID can be transferred to the memory of the user's portable identification device.

When the multi-media identity data is for a new user or new MMID, step 340 can be performed where a new MMID can be created for the user. The new MMID can then be populated with the extracted metadata values and generated multi-media fingerprints in step 345.

In step 350, the specified security parameters and/or external security conditions can be assigned to the new MMID. The new MMID can be stored in the MMID library in step 355. Then, in step 360, a copy of the new MMID can be transferred to the memory of the user's portable identification device.

Figure 4:
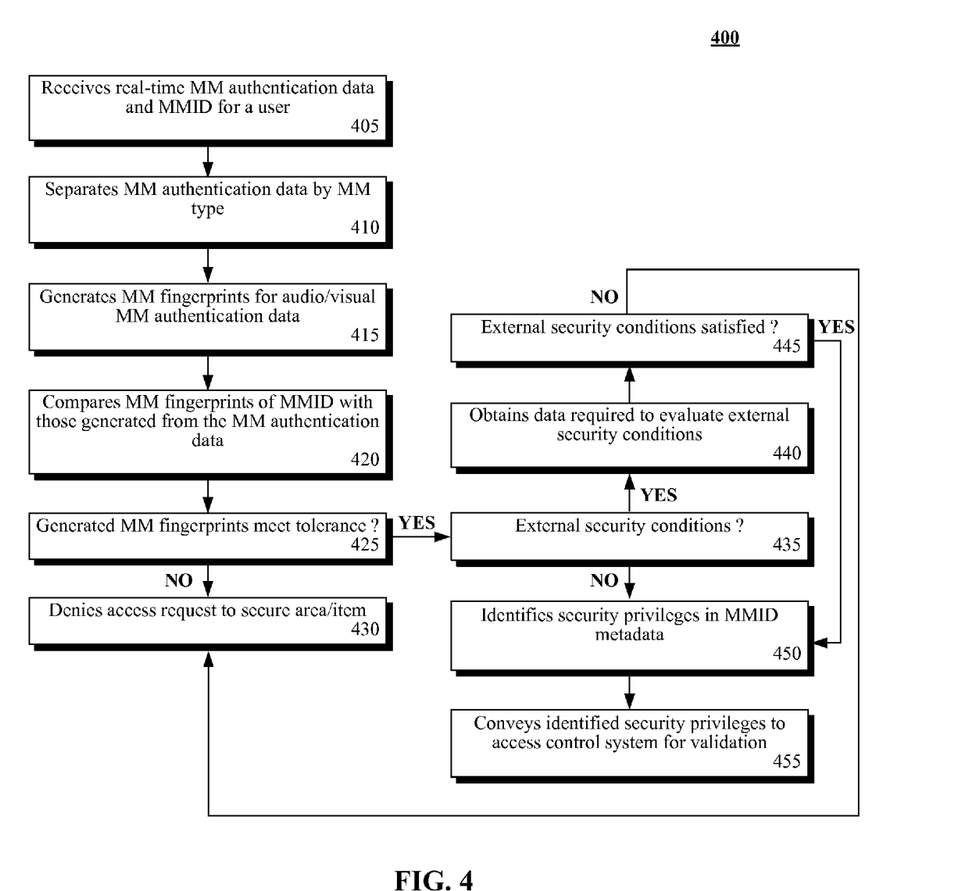
FIG. 4 is a flowchart of a method detailing operation of the intelligent feedback tool in accordance with embodiments of the inventive arrangements disclosed herein.

FIG. 4 is a flowchart of a method 400 detailing verification of a MMID by the multi-media identity management system to access a secure area/item in accordance with embodiments of the inventive arrangements disclosed herein. Method 400 can be performed within the context of system 100 as well as in conjunction with methods 200 and/or 300.

Method 400 can begin in step 405 where the multi-media identity management system can receive real-time multi-media authentication data and the MMID for a user. The multi-media authentication data can be separated by multi-media type in step 410.

In step 415, multi-media fingerprints can be generated for the audio and/or visual items of multi-media authentication data. The generated multi-media fingerprints can be compared with the multi-media fingerprints contained in the MMID in step 420.

It can be determined if the generated multi-media fingerprints are within tolerance when compared to their corresponding multi-media fingerprints of the MMID in step 425. In essence, step 425 can determine if the generated multi-media fingerprints match those of the MMID. However, it is strongly advised to define tolerances above and below the baseline of the multi-media fingerprints to account for the dynamic nature of the user (i.e., a spoken phrase read while the user is different moods have different digital signatures) and fluctuations in different multi-media capture devices.

When at least one generated multi-media fingerprint is outside the tolerance, the user can be denied access to the secure area/item in step 430. When all the generated multi-media fingerprints are within tolerances, then step 435 can be performed where the multi-media identity management system can determine if there are any external security conditions defined for the MMID.

When the MMID does not have any external security conditions, the security privileges of the MMID can be identified in step 450. In step 455, the identified security privileges can then be conveyed to the access control system for validation.

It should be noted that steps 450 and 455 can represent an embodiment of the present disclosure where the multi-media identity management system acts as a central hub of the overall security system. These steps can be modified to account for alternate embodiments and/or configurations without departing from the spirit of the present disclosure.

When the MMID does have external security conditions, step 440 can be performed where the data required to evaluate the external security conditions can be obtained, such as from an additional file or secondary system. Upon obtaining the data, it can be determined if the external security conditions are satisfied in step 445.

When the external security conditions have not been satisfied, step 430 can be run where the user is denied access to the secure area/item. When the external security conditions have been satisfied, then flow can proceed to step 450 to continue with the identification and validation of the security privileges of the MMID.

Figure 5:
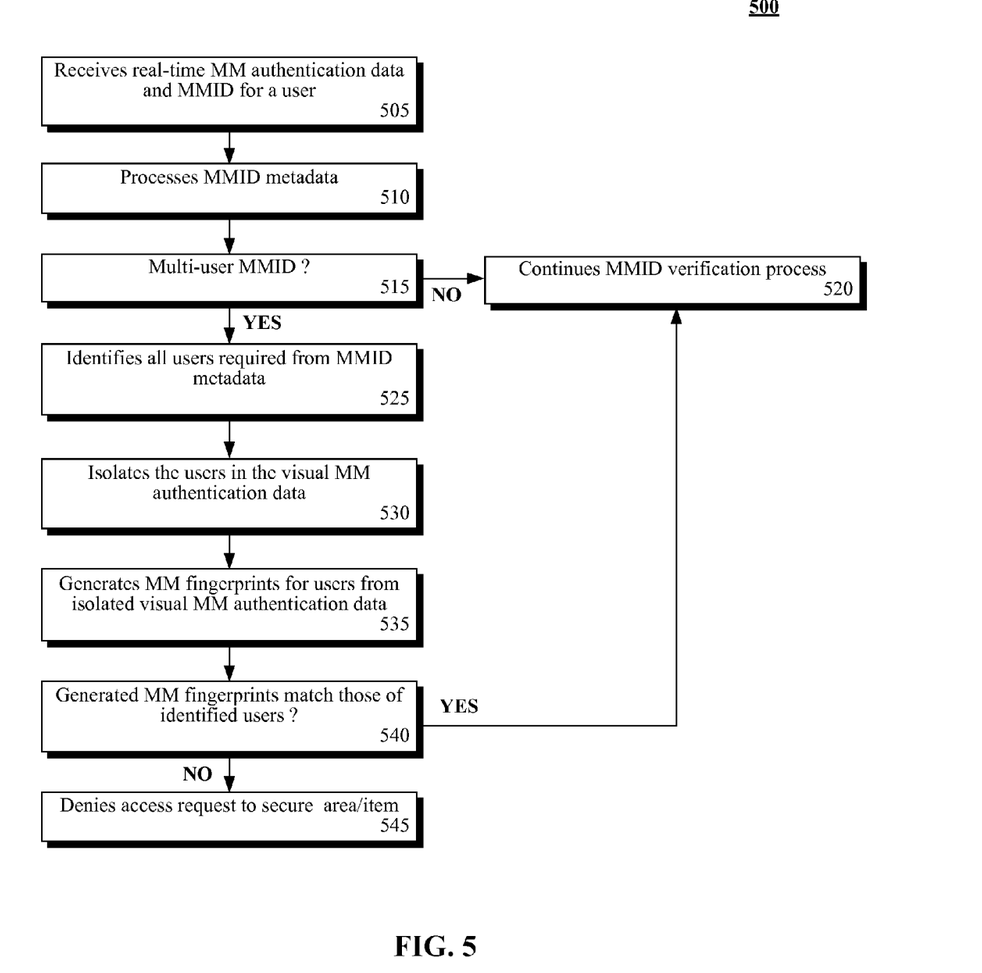
FIG. 5 is a flowchart of a method describing verification of a multi-user MMID by the multi-media identity management system to access a secure area/item in accordance with embodiments of the inventive arrangements disclosed herein.

FIG. 5 is a flowchart of a method 500 describing verification of a multi-user MMID by the multi-media identity management system to access a secure area/item in accordance with embodiments of the inventive arrangements disclosed herein. Method 500 can be performed within the context of system 100 as well as in conjunction with methods 200 and/or 400.

Method 500 can begin in step 505 where the multi-media identity management system can receive real-time multi-media authentication data and the MMID for a user. The multi-media authentication data can be processed in step 510, as outlined in steps 410 and 415 of method 400.

In step 515, it can be determined if the received MMID is a multi-user MMID. That is, step 515 can determine if the presence of multiple users is required to validate the MMID. When the received MMID is not a multi-user MMID, step 520 can execute where the MMID verification process can continue as discussed in method 400.

When the received MMID is a multi-user MMID, the users required for verification can be identified from the MMID metadata in step 525. Performance of step 525 can require that the implementation of the multi-media identity management system support at least one metadata element that defines the users of a multi-user MMID.

In step 530, the users in the visual item of multi-media authentication data can be isolated. Step 530 can utilize a variety of facial recognition technology and/or techniques. Multi-media fingerprints can be generated for the users from the isolated visual multi-media authentication data in step 535.

In step 540, the multi-media identity management system can determine if the multi-media fingerprints generated from the isolated multi-media authentication data match the visual multi-media fingerprints of the identified users. Performance of step 540 can occur in a variety of ways, depending upon the implementation and/or configuration of the overall security system.

For example, all of the users may be required to submit their MMIDs in addition to the multi-user MMID and other multi-media authentication data and then take a group picture. Alternately, the users can submit the multi-user MMID and the multi-media identity management system can find their individual MMIDs in the MMID library for comparison.

When the generated multi-media fingerprints do not match those of the identified users, the multi-media identity management system can deny the users access to the secure area/item in step 545. When the generated multi-media fingerprints do match the identified users, flow can proceed to step 520 where the MMID verification process can continue.

Figure 6:
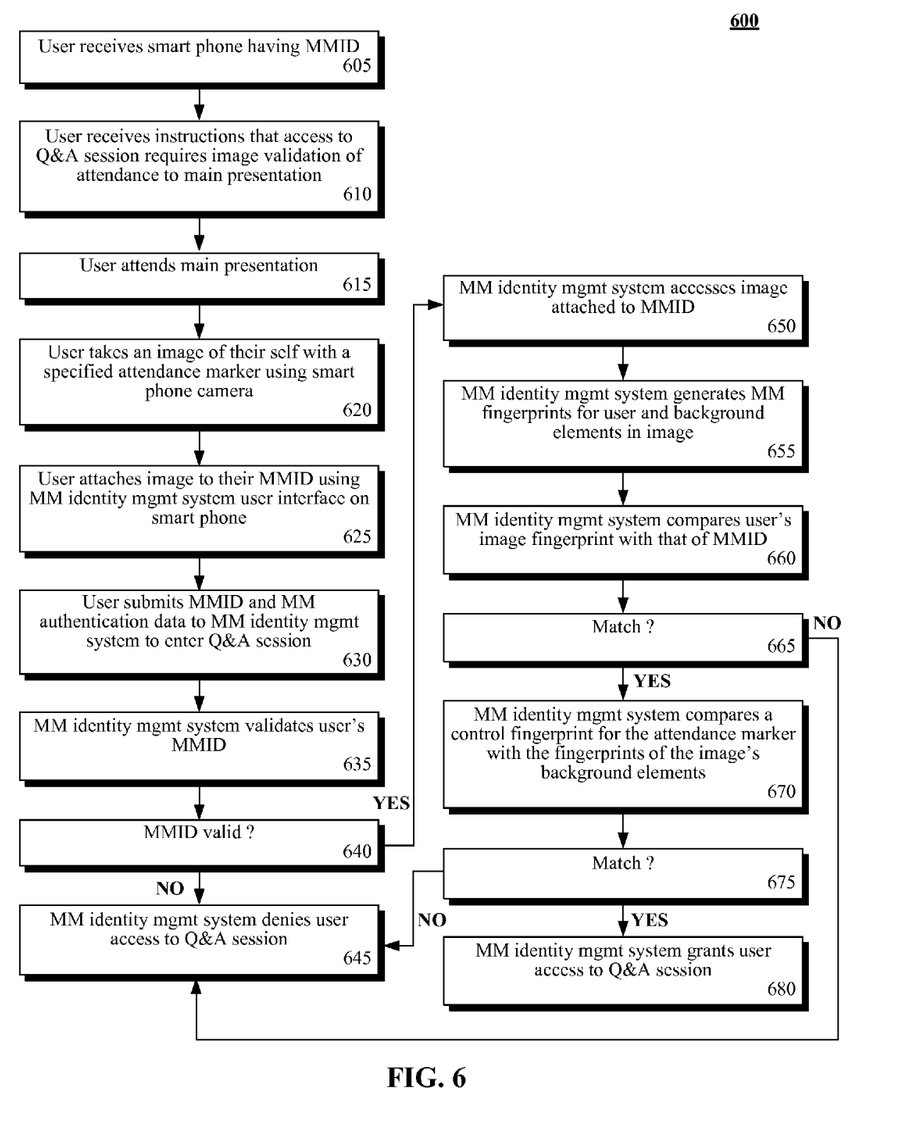
FIG. 6 is a flowchart of a method illustrating an example usage scenario of the MMID and multi-media identity management system in accordance with embodiments of the inventive arrangements disclosed herein.

FIG. 6 is a flowchart of a method 600 illustrating an example usage scenario of the MMID and multi-media identity management system in accordance with embodiments of the inventive arrangements disclosed herein. Method 600 can be performed within the context of system 100 as well as in conjunction with methods 200, 300, and/or 400.

The example scenario illustrated in method 600 can be that of a user attending a conference in a facility where access to the various rooms is being controlled by the multi-media identity management system. Method 600 can begin in step 605 where a user can receive a smart phone having a MMID.

The user can receive instructions that access to a later Q&A session requires image validation of attendance to the main presentation in step 610. The information provided to the user in step 610 can represent an external security condition.

In step 615, the user can attend the main presentation. The user can take an image of their self with a specified attendance marker using the camera of the smart phone in step 620. Alternately, a second user can take the picture of the attending user with the attendance marker in step 620.

In step 625, the user can attach the image to their MMID using a user interface for the multi-media identity management system installed on the smart phone. The user interface can include the functionality to support this operation.

The user can submit their MMID and multi-media authentication data to enter the Q&A session in step 630. In step 635, the multi-media identity management system can validate the user's MMID. The validity of the MMID can be determined in step 640.

When the MMID is not valid, the multi-media identity management system can deny the user access to the Q&A session in step 645. When the MMID is valid, step 650 can execute where the multi-media identity management system can access the image attached to the MMID.

The multi-media identity management system can generate multi-media fingerprints for the user and background elements in the image in step 655. Step 655 can be performed similar to steps 525-535 of method 500.

In step 660, the multi-media identity management system can compare the user's multi-media fingerprint generated from the image with that of the MMID. It can be determined if the image's multi-media fingerprint matches the user's MMID multi-media fingerprint in step 665.

When the multi-media fingerprints do not match, flow of method 600 can proceed to step 645 where the multi-media identity management system can deny the user access to the Q&A session. When the multi-media fingerprints do match, the multi-media identity management system can compare a control multi-media fingerprint for the attendance marker with the multi-media fingerprints generated for the image's background elements in step 670.

In step 675, it can be determined if the multi-media fingerprint of the attendance marker matches the multi-media fingerprint of a background element of the image. When the multi-media fingerprints do not match, flow of method 600 can proceed to step 645 where the multi-media identity management system can deny the user access to the Q&A session.

When the multi-media fingerprints match, indicating that both the user and the attendance marker are contained within the attached image, the multi-media identity management system can grant the user access to the Q&A session in step 680.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for utilizing multi-media identities for access control to a secure area or item comprising:

providing of a multi-media identity to an entity by a multi-media identity management system for use with an access control system, wherein the multi-media identity is a digital identifier whose multi-media data elements define multi-media authentication data expected to be used by the entity and security privileges of the access control system assigned to the entity, wherein the multi-media identity is stored upon a portable identification device;

receiving the provided multi-media identity and multi-media authentication data in an access request for one of a secure area and a secure item, wherein the multi-media authentication data comprises at least a digital image of the entity, wherein the multi-media authentication data is captured by at least one multi-media capture device in one of real-time and near real-time;

verifying the multi-media authentication data against the multi-media data elements of the multi-media identity, wherein each multi-media authentication data item is compared to a multi-media data element of the multi-media identity of a corresponding multi-media type;

validating the security privileges of the multi-media identity to those defined for the one of the secure area and the secure item;

when the multi-media authentication data, multi-media identity, and security privileges are valid for the one of the secure area and the secure item, granting the entity access to the one of the secure area and the secure item; and when at least one of the multi-media authentication data, multi-media identity, and security privileges is invalid, denying the entity access to the one of the secure area and the secure item.

2. The method of claim 1, wherein providing of the multi-media identity further comprises:

receiving a plurality of multi-media identity data that uniquely describes the entity;

processing the plurality of multi-media identity data into metadata and at least one multi-media fingerprint of a multi-media type corresponding to the multi-media type of an originating multi-media identity data item, wherein a multi-media fingerprint is a baseline representation for a multi-media identity data item;

producing the multi-media identity for the entity using the metadata and at least one multi-media fingerprint processed from the plurality of multi-media identity data;

storing the multi-media identity in a multi-media identity library, wherein the multi-media identity library stores multi-media identities currently being used by the multi-media identity management system; and transferring a copy of the generated multi-media identity to a memory location of the portable identification device.

3. The method of claim 2, wherein, when creating a new multi-media identity, producing the multi-media identity further comprises:

creating a new multi-media identity for the entity;

populating the new multi-media identity with the metadata and at least one multi-media fingerprint; and associating at least one set of security privileges defined within the access control system to the new multi-media identity.

4. The method of claim 3, wherein, when at least one external security condition is included with the plurality of multi-media identity data, populating the new multi-media identity further comprises:

identifying at least one external security condition submitted for the entity, wherein an external security condition defines a circumstance outside a purview of the access control system whose satisfaction is required to validate the new multi-media identity; and adding the identified at least one external security condition to the new multi-media identity, wherein said at least one external security condition is written in a standardized format interpretable by the multi-media identity management system.

5. The method of claim 2, wherein, when updating an existing multi-media identity, producing the multi-media identity further comprises:

querying the multi-media identity library for the at least one existing multi-media identity associated with an identifier of the entity;

ascertaining an ID type of each existing multi-media identity returned by the query, wherein the ID type comprises one of a individual ID type and a group ID type, wherein the entity associated with the individual ID type is a singular person and the entity associated with the group ID type is comprised of multiple people;

filtering results of the query to exclude existing multi-media identities having the group ID type, wherein only those existing multi-media identities having the individual ID type remain in a results set of the query; and updating at least one of the metadata and the at least one multi-media fingerprint of the existing multi-media identities in the results set with at least one of the metadata and the at least one multi-media fingerprint processed from the received plurality of multi-media identity data.

6. The method of claim 1, wherein verification of the multi-media authentication data further comprises:

processing the multi-media authentication data into metadata and at least one multi-media fingerprint;

comparing the processed metadata and at least one multi-media fingerprint with the metadata and at least one multi-media fingerprint contained in the provided multi-media identity;

when comparison of the metadata and at least one multi-media fingerprint indicates a match, recognizing the provided multi-media identity as valid; and when comparison of the metadata and at least one multi-media fingerprint indicates a discrepancy, recognizing the provided multi-media identity as invalid.

7. The method of claim 6, wherein, when the multi-media identity includes at least one external security condition, said method further comprises:

determining auxiliary data required to evaluate the at least one external security condition of the multi-media identity, wherein an external security condition defines a circumstance outside a purview of the access control system whose satisfaction is required to validate the multi-media identity;

obtaining the determined auxiliary data;

evaluating the at least one external security condition; and when the evaluation of one of the at least one external security condition is unsatisfied, changing the recognition of the multi-media identity from valid to invalid.

8. A system for utilizing multi-media identities for access control to a secure area or item comprising:

a multi-media identity that is a digital data container associated with an entity having at least one multi-media data element that defines at least one multi-media aspect of the entity, said multi-media identity further comprises:

a plurality of metadata for representing textual multi-media data elements as field-value pairs;

at least one multi-media fingerprint representing non-textual multi-media data elements in a distilled format, wherein a multi-media fingerprint is a baseline representation of the at least one multi-media aspect of the entity;

at least one item of entity-submitted multi-media authentication data as identification of the entity, wherein a quantity of multi-media authentication data items submitted matches a quantity and multi-media types of multi-media data elements contained in the entity's multi-media identity; and a multi-media identity management system configured to manage multi-media identities and validate the multi-media identity based upon a comparison with the at least one item of entity-submitted multi-media authentication data.

9. The system of claim 8, further comprising:

a portable identification device having a memory store configured to receive and store a copy of the entity's multi-media identity in said memory store.

10. The system of claim 9, wherein the portable identification device comprises at least one of a smart phone, a cell phone, a laptop computer, a portable multi-media electronic device, a portable game console, a non-electronic device having a magnetic strip storage medium, and a non-electronic device having a radio frequency identification (RFID) storage medium.

11. The system of claim 8, wherein the multi-media identity management system further comprises:

a multi-media fingerprint system configured to generate the at least one multi-media fingerprint for the multi-media identity and generate multi-media fingerprints for non-textual multi-media authentication data, wherein the multi-media identity management system compares both multi-media fingerprints to determine validity of the multi-media authentication data;

a multi-media identity library for storing multi-media identities that are currently in use by entities; and a user interface configured to act as an interaction mechanism to support functionality for creating multi-media identities and maintaining the multi-media identity library.

12. The system of claim 8, further comprising:
an access control system having a plurality of multi-media capture devices configured to regulate access to at least one of a secure area and a secure item based upon a plurality of security parameters, wherein the access control system is capable of communicating and exchanging data with the multi-media identity management system, wherein the at least one item of multi-media authentication data is submitted using the plurality of multi-media capture devices, wherein the access control system performs its evaluation of security parameters when the multi-media identity management system determines the multi-media identity to be valid.

13. The system of claim 12, wherein the access control system is an integrated component of the multi-media identity management system.

14. The system of claim 8, wherein the multi-media identity further comprises:
at least one external security condition that defines an additional requirement to validate the multi-media identity, wherein the at least one external security condition is unrelated to the at least one multi-media aspect of the entity.

15. The system of claim 8, wherein at least one of a one-to-one relationship, a many-to-one relationship, and a one-to-many relationship is supported by the multi-media identity management system between entities and the multi-media identities.

16. A computer program product comprising a non-transitory computer readable storage medium having computer usable program code embodied therewith, the computer usable program code comprising:
computer usable program code configured to provide a multi-media identity to an entity for use with an access control system, wherein the multi-media identity is a digital identifier whose multi-media data elements define multi-media authentication data expected to be used by the entity and security parameters of the access control system assigned to the entity, wherein the multi-media identity is stored upon a portable identification device;
computer usable program code configured to receive the provided multi-media identity and multi-media authentication data in an access request for one of a secure area and a secure item, wherein the multi-media authentication data comprises at least a digital image of the entity, wherein the multi-media authentication data is captured by at least one multi-media capture device in one of real-time and near real-time;
computer usable program code configured to verify the multi-media authentication data against the multi-media data elements of the multi-media identity, wherein each multi-media authentication data item is compared to a multi-media data element of the multi-media identity of a corresponding multi-media type;
computer usable program code configured to, when the multi-media authentication data, multi-media identity, and security privileges are determined valid for the one of the secure area and the secure item, notify the access control system that the entity is allowed access, wherein said access control system performs additional validation actions, when necessary; and
computer usable program code configured to, when at least one of the multi-media authentication data and multi-media identity is invalid, notify the access control system that the entity is denied access.

17. The computer program product of claim 16, wherein providing the multi-media identity further comprises:
computer usable program code configured to receive a plurality of multi-media identity data that uniquely describes the entity;
computer usable program code configured to process the plurality of multi-media identity data into metadata and at least one multi-media fingerprint of a multi-media type corresponding to the multi-media type of an originating multi-media identity data item, wherein a multi-media fingerprint is a baseline representation for a multi-media identity data item;
computer usable program code configured to produce the multi-media identity for the entity using the metadata and at least one multi-media fingerprint processed from the plurality of multi-media identity data;
computer usable program code configured to store the multi-media identity in a multi-media identity library, wherein the multi-media identity library stores multi-media identities currently in use; and
computer usable program code configured to transfer a copy of the generated multi-media identity to a memory location of the portable identification device.

18. The computer program product of claim 17, wherein, when creating a new multi-media identity, producing the multi-media identity further comprises:
computer usable program code configured to create a new multi-media identity for the entity;
computer usable program code configured to populate the new multi-media identity with the metadata and at least one multi-media fingerprint; and
computer usable program code configured to associate at least one set of security privileges defined within the access control system to the new multi-media identity.

19. The computer program product of claim 17, wherein, when updating an existing multi-media identity, producing the multi-media identity further comprises:
computer usable program code configured to query the multi-media identity library for the at least one existing multi-media identity associated with an identifier of the entity;
computer usable program code configured to ascertain an ID type of each existing multi-media identity returned by the query, wherein the ID type comprises one of a individual ID type and a group ID type, wherein the entity associated with the individual ID type is a singular person and the entity associated with the group ID type is comprised of multiple people;
computer usable program code configured to filter results of the query to exclude existing multi-media identities having the group ID type, wherein only those existing multi-media identities having the individual ID type remain in a results set of the query; and
computer usable program code configured to update at least one of the metadata and the at least one multi-media fingerprint of the existing multi-media identities in the results set with at least one of the metadata and the at least one multi-media fingerprint processed from the received plurality of multi-media identity data.

20. The computer program product of claim 16, wherein verification of the multi-media authentication data further comprises:
computer usable program code configured to process the multi-media authentication data into metadata and at least one multi-media fingerprint;
computer usable program code configured to compare the processed metadata and at least one multi-media fingerprint with the metadata and at least one multi-media fingerprint contained in the provided multi-media identity;

computer usable program code configured to, when comparison of the metadata and at least one multi-media fingerprint indicates a match, recognize the provided multi-media identity as valid; and computer usable program code configured to, when comparison of the metadata and at least one multi-media fingerprint indicates a discrepancy, recognize the provided multi-media identity as invalid.

\* \* \* \* \*